United States Patent [19]
Stenborg et al.

[11] Patent Number: 5,295,763
[45] Date of Patent: Mar. 22, 1994

[54] METHOD FOR CONTROLLING GAS MIGRATION FROM A LANDFILL

[75] Inventors: James W. Stenborg, Wexford; Darrell B. Williams, Imperial, both of Pa.

[73] Assignee: Chambers Development Co., Inc., Pittsburgh, Pa.

[21] Appl. No.: 906,767

[22] Filed: Jun. 30, 1992

[51] Int. Cl.⁵ .............................................. B09B 1/00
[52] U.S. Cl. .................................... 405/129; 405/128; 166/286
[58] Field of Search .............. 405/128, 129, 132, 234; 166/286

[56] References Cited

U.S. PATENT DOCUMENTS

| | | | |
|---|---|---|---|
| 3,222,842 | 12/1965 | Luedloff et al. | 405/234 X |
| 4,550,786 | 11/1985 | Rosenstock | 405/234 X |
| 4,651,824 | 3/1987 | Gradle | 405/129 X |
| 4,895,085 | 1/1990 | Chips | 405/129 X |
| 4,946,312 | 8/1990 | Loock et al. | 405/129 |
| 4,984,594 | 1/1991 | Vinegar et al. | 405/129 X |
| 5,024,556 | 6/1991 | Timmerman | 405/129 X |
| 5,066,166 | 11/1991 | Hansen | 405/129 X |
| 5,114,497 | 5/1992 | Johnson et al. | 405/129 X |

*Primary Examiner*—Randolph A. Reese
*Assistant Examiner*—J. Russell McBee
*Attorney, Agent, or Firm*—Ansel M. Schwartz

[57] ABSTRACT

The present invention is a method of controlling this gas migration through the subsurface strata about the landfill. The method comprises the step of installing an extraction well having a zone of influence in proximity to the perimeter of the landfill. Then, there is the step of horizontally fracturing hydraulically the subsurface strata outside the perimeter of the landfill but in proximity to the perimeter of the landfill such that the resulting horizontal fractures in the subsurface strata fluidically communicate with the landfill and the zone of influence of the extraction well. The present invention also pertains to a system for controlling gas migration in subsurface strata about a landfill. The system is comprised of an extraction well which is disposed in the landfill in proximity to the landfill's perimeter. The extraction well has a zone of influence which extends beyond the perimeter of the landfill. The system is also comprised of a monitoring well which is disposed outside of the perimeter of the landfill in the subsurface strata. There is a hydraulic fracturing mechanism for horizontally fracturing subsurface strata between the monitoring well and the extraction well such that horizontal fractures are formed which fluidically communicate with the zone of influence. Moreover, the system is comprised of a pump fluidically connected to the extraction well for draining fluid therethrough and creating the zone of influence.

7 Claims, 2 Drawing Sheets

METHOD FOR CONTROLLING GAS MIGRATION FROM A LANDFILL

FIELD OF THE INVENTION

The present invention is related in general to landfills. More specifically, the present invention is a method of controlling gas migration through the subsurface strata surrounding a landfill.

BACKGROUND OF THE INVENTION

One of the responsibilities that a municipal waste landfill owner/operator faces is the management of landfill-generated gas. Landfill gas is a by-product of the anaerobic decomposition of the biodegradable constituents of the landfilled waste. The primary components of landfill gas are Methane ($CH_4$), and Carbon Dioxide ($CO_2$). Methane carries the potential hazard of accumulating in uncontrolled void spaces and, if ignited, causing a fire or explosion. The explosive range of methane is five to fifteen percent in air by volume (5-15% vol. air).

Landfill gas management practices involve installing extraction devices such as vertical extraction wells or horizontal trenches in the waste mass and capturing and conveying the gas to a combustion or energy recovery facility. Modern-day landfills also employ the use of impermeable liners to contain landfill gas and other landfill-generated fluids. However, many older landfills exist where there was an inadequate containment system or there was no containment system installed, and the release of the gas can pose a potential threat to the environment. As the gas is generated, a pressure gradient is established, and the gas begins to migrate in the direction that offers the least resistance to flow. Since the waste is usually deposited in layers, or lifts, and daily cover is usually specified to minimize gaseous emissions and odors, the potential pathway of least resistance to gas flow is often lateral. Consequently, gas sometimes escapes (migrates) into the surrounding soils and rock formations. Gas monitoring wells are installed in these soils to track the potential migration of landfill gas. The occurrence of methane in the perimeter gas monitoring wells is the reference point to which the effectiveness of most gas management systems is measured.

The present invention provides a method of altering gas migration to an extent that the extraction devices can reverse the direction of gas flow in the soil and rock formations, and eliminate offsite landfill gas migration. The preferred procedure involves the injection of a fracturing fluid and propping agent into the zone of influence under sufficient pressure to induce new fractures and propagate existing fractures, bedding planes and lithologic discontinuities. These new fractures connect those areas where a draw exists from an active extraction well with fractures that contain gas.

SUMMARY OF THE INVENTION

The present invention is a method of controlling gas migration through the subsurface strata about the landfill. The method comprises the step of installing an extraction well having a zone of influence that extends beyond the perimeter of the landfill. Then, there is the step of fracturing hydraulically the geologic strata outside the perimeter of the landfill but in proximity to the perimeter of the landfill such that the resulting horizontal fractures in the subsurface strata fluidically communicate with the vacuum in the landfill zone of influence of the extraction well.

The present invention also pertains to a system for controlling gas migration in subsurface strata about a landfill. The system is comprised of an extraction well which is disposed in the landfill in proximity to the landfill's perimeter. The extraction well has a zone of influence which extends beyond the perimeter of the landfill. The system is also comprised of a monitoring well which is disposed outside of the perimeter of the landfill in the subsurface strata. There is a hydraulic fracturing mechanism for horizontally fracturing subsurface strata between the monitoring well and the extraction well such that horizontal fractures are formed which fluidically communicate with the zone of influence. Moreover, the system is comprised of a pump fluidically connected to the extraction well for draining fluid therethrough and creating the zone of influence.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
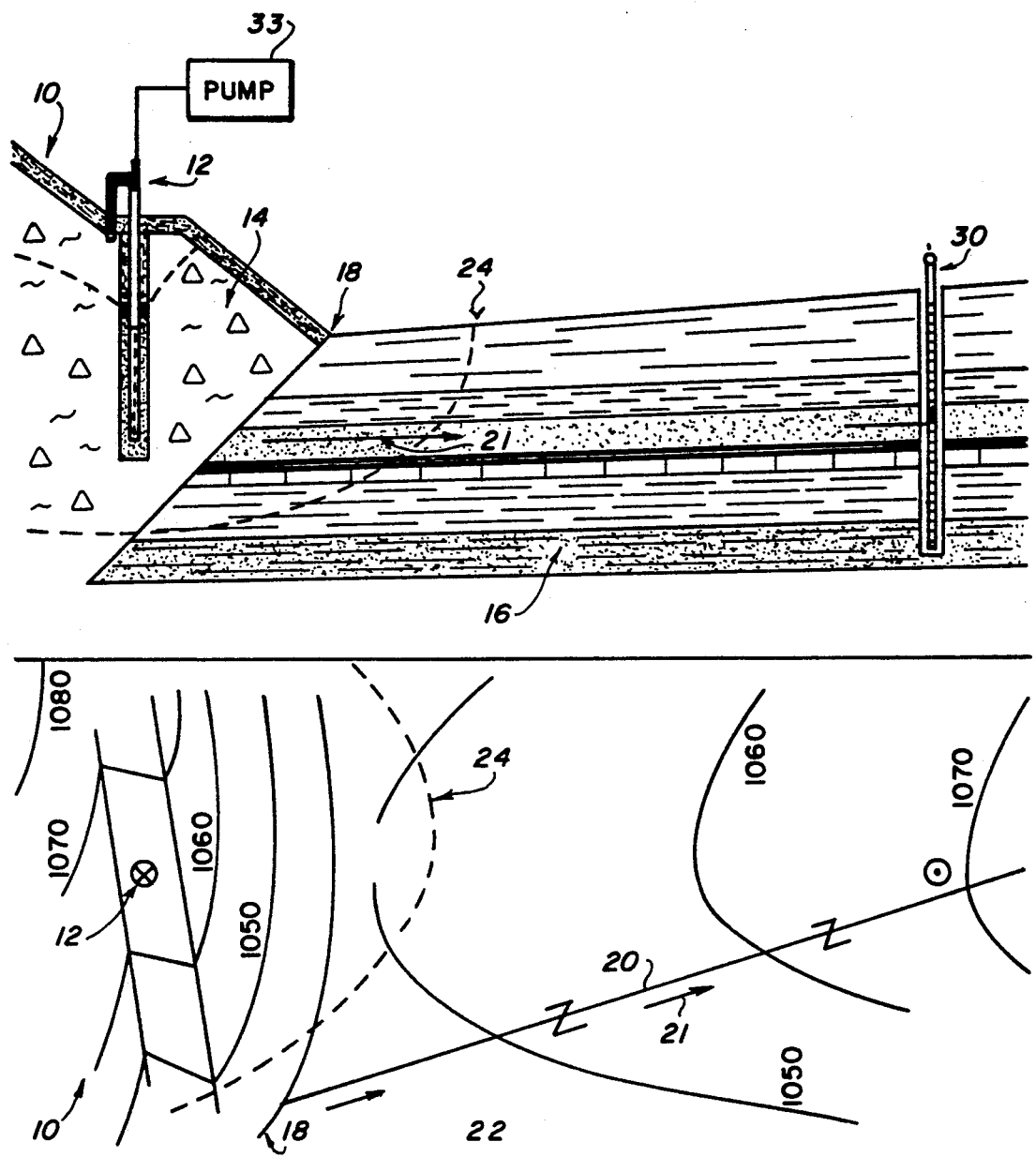
FIG. 1 is a cross sectional and profile schematic representation of a landfill and surrounding strata.

Referring now to the drawings wherein like reference numerals refer to similar or identical parts throughout the several views, and more specifically to FIG. 1 thereof, there is shown a landfill 10 having at least one extraction well 12 where a draw is induced for collecting gas, for instance, created by decomposing waste 14 therein, although the gas could be from any source. The subsurface strata 16 along the perimeter 18 of the landfill 10 has fractures, bedding planes or other lithologic discontinuities 20 that allow gas to escape at a location 22 which is outside the zone of influence 24 of the extraction well 12 and thus possibly place the landfill in a non-compliant status with the applicable governmental agency rules and regulations.

Figure 2:
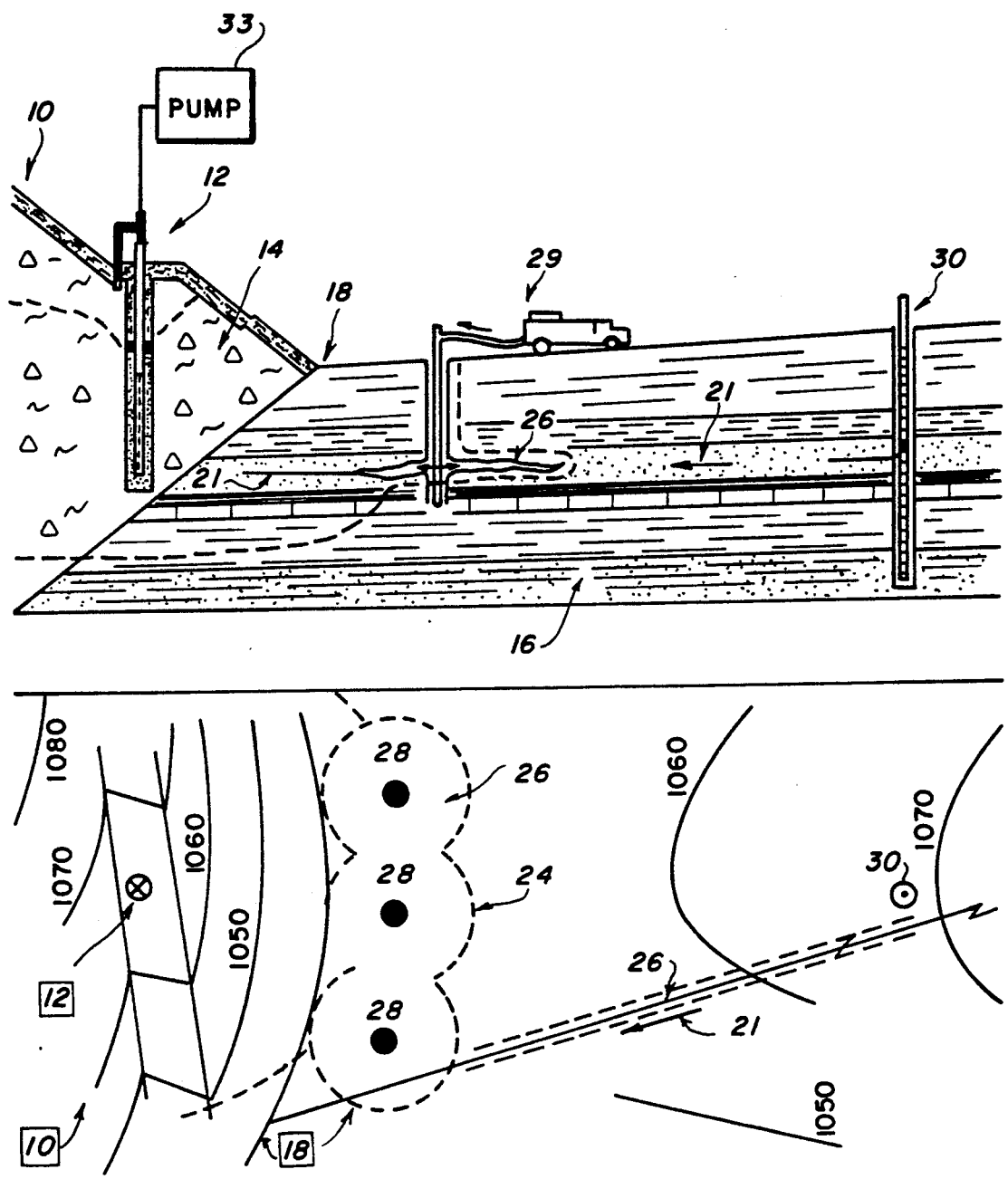
FIG. 2 is a cross sectional and profile schematic representation of a landfill and surrounding strata having fracture wells present.

FIG. 2 depicts the present invention which is a system 100 and method of controlling this gas migration through the subsurface strata 16 about the landfill 10. The method comprises the step of installing an extraction well 12 having a zone of influence 24 that extends beyond the perimeter 18 of the landfill 10. Then, there is the step of fracturing hydraulically the subsurface strata 16 outside the perimeter 18 of the landfill 10 but in proximity to the perimeter 18 of the landfill 10 such that the resulting horizontal fractures 26 in the subsurface strata 16 hydraulically communicate with the landfill 10 and the zone of influence 24 of the extraction well 12. In general, fracture is the loss of cohesion of a rock body that creates partings. The fracturing can yield horizontal fractures 26 which are new fractures, serve to open existing fractures, bedding planes or other lithologic discontinuities and/or connect new and existing fractures to provide preferential flow paths for gas collected by the extraction well. Regardless of the previously existing fracture pattern, by horizontally fracturing hydraulically, the new fractures serve to define the preferential gas migration paths toward the landfill, and direct the gas in a desired manner. Inducing fracturing modifies a rock body with anisotropic physical properties to a rock body displaying isotropic properties. (Isotropy is the condition of having the same properties in all directions).

Preferably, the fracturing step includes the steps of drilling a fracture well 28 in the subsurface strata 16 in proximity to the perimeter 18 of the landfill 10 and injecting pressurized fluid into the subsurface strata 16. The injecting step preferably includes the steps of creating horizontal fractures 26 in the subsurface strata 16 and depositing propping agents within the fractures 26 to maintain the fractures 26 in an open state. The pressurized fluid is preferably fresh water and the propping agent is preferably sand, with the sand mixed with the fresh water.

Techniques on fracturing subsurface strata 16 with pressurized water having suspended particle for maintaining the separation of the fractures is given in "Well Design and Drilling and Production, by Craft, Holden and Graves, pp. 485–500, Prentice-Hall, 1962" and in "Drilling and Well Completions, by Carl Gatlin, Prentice Hall, Inc., 1960" (both of which are incorporated by reference).

Preferably, the basic procedure utilizes hydraulic fracturing and involves the injection of a fracturing fluid, such as water, and propping agent, such as sand, into the subsurface strata 16 under sufficient pressure to open existing fractures 26 and/or create new ones. These are extended some distance around the fracture well 28 by continued high pressure injection after the initial breakdown or rock rupture has occurred. Upon cessation of pumping (as pressure is reduced) the fractures 26 remain open, being held in place by the propping agent, such as a carefully sized, silica sand. This process is applicable to virtually all types of subsurface strata.

The sand most commonly used as a propping agent is 20–40 mesh, (0.0328–0.0164 in.) well rounded, silica sand which has a packed permeability of about 300 darcys. Multiple sand sizes also are often applied in fracture treatments. Relatively small sand is used at first, a larger size being applied next to prop the greater fracture width near the well.

Sand concentrations of ½ to 4 lb/gal have been frequently used in fracturing. It is difficult to define any universally applicable optimum concentration and quite possibly such a figure may vary with the area. From field experience, it appears that 1 to 2 lb/gal is the most commonly applied range of concentration. The proposed injection rate and the fracture fluid's filtration loss, as well as subsurface strata formation characteristics, generally govern field practice. Injection rates are controlled by the fracture fluid flow properties, available pump horsepower, and the size of the injection string (tubing or casing) of the fracture well 28. Moreover, a plurality of fracture wells 28 can be drilled, each having a predetermined depth and position to more effectively horizontally fracture the strata 16 as desired. Installing a plurality of fracture wells, combined with varying the radial fracture of each well may be necessary to reach the expected results.

Before the step of installing an extraction well 12, there is preferably the step of installing a monitoring well 30 such that the fracture well 28 is between the monitoring well 30 and the landfill 10. With the monitoring well 28 outside of the location of the landfill, it can be determined whether the resultant horizontal fracturing has had the desired effect of controlling the migrating gas. Additionally, after the installing step, there is preferably the step of drawing fluid through the extraction well, for instance, with a pump 33. It should be noted that the zone of influence 24 of the extraction well 12 must encompass the migration pathway 21 to control it. This dictates that the location of the fracture wells 28 must be such that the resulting horizontal fracturing will be encompassed by the zone of influence of the extraction well 12. To identify the location(s) of the fracture well, preferably, pressure monitoring through the placement of temporary monitoring wells along the perimeter of the landfill in the strata is performed. The temporary monitoring well can indicate whether the zone of influence encompasses the strata within which the temporary monitoring well is disposed. If it is encompassed, then horizontal fractures that occur therein from the fracturing will be within the zone of influence and will be fluidically connected thereto. Preferably, the method includes monitoring for pressure, and other fluid characteristics at the gas extraction and monitoring wells before, during and after the hydraulic fracturing process to observe the resulting impacts. The desired effect is to reduce the methane concentration in the appropriate monitoring wells to zero.

In the operation of the preferred embodiment, it is assumed that previous activities have taken place that have led to identifying the need to perform this unconventional attempt to remediate landfill gas migration. These previous activities can include:

A. Installing Gas Monitoring Wells
B. Measuring and recording combustible gas levels present in the monitoring wells
C. Identifying the need to control gas migration
D. Installing an active gas extraction system
E. Installing migration barriers where deemed appropriate Once the decision is made to attempt to fracture the strata which surrounds the landfill generally in the area of gas migration, the following procedure would be exercised.

1. Determine the regulatory approval process to apply the method. Then obtain permits, where appropriate.
2. Identify locations where the fracture wells will be drilled. These locations would be a function of:
   a. Distance between monitoring well and edge of waste
   b. Depth of the migrating gas
   c. Geologic characteristics of the formation(s) to be fractured
   d. Possible interference with previously installed control devices
   e. Known locations of existing fractures
   f. Extraction well location
   g. The amount of extraction well vacuum
   h. Groundwater conditions in the area
   i. The location(s) where the geologic strata is under influence of the extraction well There can of course be more than one extraction well 12 having a zone of influence that communicates with the horizontal fractures. However, typically, there will only be one extraction well 12 which has a zone of influence in communication with the horizontal fractures. Additionally, the greater the vacuum applied to the extraction well, then the further the extraction well can be isolated from the perimeter of the landfill and thus from the horizontal fractures.

3. Determine the orientation of the resulting fracture, i.e. vertical, horizontal or inclined. Fracture theory states that the resulting orientation of an induced fracture may first occur along the plane that is perpendicular to the least principal stress (Craft, Holden & Graves, "Well Design: Drilling and Production", Prentice-Hall, 1962, p. 486, incorporated by reference). It has been shown that horizontal fractures will most likely be created at depths less than 2000 feet. (Petroleum Engineering Handbook, p. 55-2, incorporated by reference). Therefore, it may be expected that a horizontal fracture orientation would occur if a fracture treatment is applied to subsurface strata surrounding a landfill.
4. Determine at what depth the perforations of the fracture well casing will be placed to fracture the appropriate strata. This can be achieved by measuring pressure and methane concentration at monitoring wells that identify the most possible depths of migration, i.e. separate the screened interval of the monitoring wells into small independent depth intervals.
5. Calculate the following fracture design values:
   a. Fracture fluid requirements (usually fresh water).
   b. Propping agent requirements (usually sand).
   c. Sand-Fluid ratio
   d. Injection Rate
   e. Fracture Formation pressure
   f. Other relevant design variables
6. Prepare well site
7. Identify possible hazards or other potential adverse impacts of conducting such a project at the specific site, and take precautionary steps to avoid these adverse impacts during the treatment process.
8. Perform the fracturing process in a predetermined and systematic manner in accordance with the plan.
9. Evaluate results during the implementation of the program and revise the various procedures as deemed necessary.

Specifically, as an example of controlling gas migration in a landfill, the following occurs. After the landfill 10 has been defined, a monitoring well 30 has been placed in the subsurface strata 16 outside the perimeter 18 of the landfill 10 and an extraction well 12 is disposed in the landfill 10 in proximity to its perimeter 18, there is still identified by the monitoring well 30 the presence of gas such that the landfill 10 is in non-compliance with governing regulations concerning the landfill 10. To remedy this non-compliance, it is determined to introduce horizontal fracturing into the subsurface strata 16 to control the gas migration pathways 21 which are allowing gas to migrate away from the landfill 10 along existing fractures 20. These fractures 20 are outside the zone of influence 24 of the extraction well 12 because the subsurface strata 16 is structured such that the zone of influence 24 does not fluidically communicate with the horizontal fracture 20 that defines the gas migration pathway 21.

First, to preform the fracturing, temporary monitoring wells are positioned between the extraction well 12 and the monitoring well 30 at the perimeter 18 of the landfill 10 in the subsurface strata 16. These temporary monitoring wells are used to ensure that the zone of influence 24 from the extraction well 12 encompasses the subsurface strata 16 at the perimeter 18 of the landfill 10 such that when horizontal fractures are introduced therein, they will communicate with the zone of influence 24 and allow any migration pathway 21 therein to be in a direction towards the extraction well 12. Once it is determined that the zone of influence 24 encompasses and thus fluidically communicates with the location where horizontal fracturing will occur, a horizontal fracture mechanism 29 is brought to the desired location between the monitoring well 30 and the extraction well 12 to provide for the horizontal fracturing. The horizontal fracturing is accomplished by there first being introduced a fracture well 28 in the subsurface strata at a predefined location between the monitoring well 30 and the extraction well 12. At least one fracture well 28 is drilled deep enough to penetrate through the locations in the subsurface strata which are believed to provide the gas migration path 21 for the gas to escape.

Once the fracture well 28 is in place, then fresh water with sand particles are introduced under pressure into the fracture well, resulting in horizontal fracturing 26 occurring in the subsurface strata 16. The new horizontal fractures 26 produced from the horizontal fracturing expand the zone of influence 24 by allowing the zone of influence from the extraction well 12 to communicate further into the subsurface strata through the new horizontal fractures 26 and intersect gas migration pathways 21. The zone of influence 24 has the effect of causing the gas migration pathway 21 to be directed towards the extraction well 12. As shown in FIG. 2, the gas migration pathway 21 has its direction changed towards the extraction well 18 to new fracture 26 which intersects the zone of influence. Any gas that is within the zone of influence is drawn into the extraction well by definition. Thus, essentially, the zone of influence of the extraction well 12 is extended all along the gas migration pathway 21 so the draw from the extraction well 12 produced from the pump 33 can now fluidically communicate therewith. Essentially, regardless of the fracture structure, the horizontal fracturing introduced by the mechanism 29 shall dominate and control the possible migration pathways 21. In this way, a series of existing vertically oriented unconnected fractures can be connected or old fractures expanded to allow the gas to migrate to allow the gas to migrate to extraction well 12. In this way, gas migration is drawn towards the extraction well 12 and away from the monitoring well 30, thus placing the landfill 10 in compliance at least with respect to this aspect of gas migration in the landfill 10.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:
1. A method of controlling gas migration with respect to a landfill comprising the steps of:
   installing an extraction well having a zone of influence in proximity to the perimeter of the landfill; and
   horizontally fracturing hydraulically the subsurface strata outside the perimeter of the landfill but in proximity to the perimeter of the landfill such that resulting horizontal fractures in the subsurface strata fluidically communicate with the landfill and the zone of influence of the extraction well so gas in the horizontal fractures can be drawn up by the extraction well.

2. A method as described in claim 1 wherein the fracturing step includes the steps of drilling a fracture well in the subsurface strata in proximity to the perimeter of the landfill, and injecting pressurized fluid into the strata.

3. A method as described in claim 2 wherein the injecting step includes the steps of creating horizontal fractures in the subsurface strata and depositing propping agents within the fractures to maintain the fractures in an open state.

4. A method as described in claim 3 wherein the pressurized fluid is fresh water and the propping agent is sand, with the sand mixed with the fresh water.

5. A method as described in claim 4 including before the step of installing an extraction well, there is the step of installing a monitoring well such that the fracture well is between the monitoring well and the landfill.

6. A method as described in claim 5 including after the installing step, the step of drawing fluid through the extraction well.

7. A system for controlling gas migration in subsurface strata about a landfill comprising:
   an extraction well which is disposed in the landfill in proximity to the landfill's perimeter, said extraction well having a zone of influence which extends beyond the perimeter of the landfill;
   a monitoring well which is disposed outside of the perimeter of the landfill in the subsurface strata;
   a hydraulic fracturing mechanism for horizontally fracturing subsurface strata between the monitoring well and the extraction well such that horizontal fractures are formed which fluidically communicate with the zone of influence so gas in the horizontal fractures can be drawn up by the extraction well; and
   a pump fluidically connected to the extraction well for draining fluid therethrough and creating the zone of influence.

* * * * *